April 19, 1938.　　　H. W. KAGLEY　　　2,114,425
FRUIT PITTING MACHINE
Filed Oct. 9, 1935　　　5 Sheets-Sheet 1

INVENTOR
HERBERT W. KAGLEY
BY
ATTORNEY

April 19, 1938.   H. W. KAGLEY   2,114,425
FRUIT PITTING MACHINE
Filed Oct. 9, 1935   5 Sheets-Sheet 5

Patented Apr. 19, 1938

2,114,425

UNITED STATES PATENT OFFICE

2,114,425

FRUIT PITTING MACHINE

Herbert W. Kagley, Lindsay, Calif., assignor to Lindsay Ripe Olive Company, Lindsay, Calif., a corporation Application October 9, 1935, Serial No. 44,175

16 Claims. (Cl. 146—27)

My invention relates to the art of removing the pits from fruit, and has particular utility in the pitting of olives.

It is an object of my invention to provide a fruit pitting machine which will operate efficiently and especially such a machine which punches the pit from the fruit.

It is another object of my invention to provide a fruit pitting machine which removes pits from the fruit without leaving a ragged hole where the pit was removed.

Another object of my invention is to provide a fruit pitting machine which will not only remove the pit from the fruit but which will segregate the properly pitted fruit from that which is not properly pitted.

Another object of my invention is to provide a fruit pitting machine in which fruit fed thereto and having abnormally sized pits is automatically segregated from the fruit having normally sized pits.

The manner of accomplishing the foregoing objects as well as further objects and advantages will be made manifest from the following description taken in connection with the accompanying drawings in which:

Referring specifically to the drawings, a fruit pitter 20 is shown therein which as aforesaid is especially adapted for the pitting of olives. This machine has a frame 21 on which is mounted a rotatable fruit carrier or table 22, a vertically reciprocating compound pit punch 23, a segregator 24 for segregating culls from good fruit, and a pit sweeper 25. The working mechanisms above mentioned are operated coordinately by a power drive mechanism 26.

The frame 21 includes legs 30 which support lower and upper platforms 31 and 32. The lower frame platform 31 is provided with vertical bearings 33 and 34. Formed integral with the upper frame platform 32 are vertical bearings 35, 36, 37, 38 and 39. Mounted as by cap screws on the upper surface of the upper platform 32 are vertical bearings 40, 41, 42, 43 and 44. It is to be here noted that the bearing 43 is in vertical alignment with bearing 36 and the bearing 44 is in vertical alignment with the bearing 39. (See Figs. 1, 2 and 3.) The upper end of the bearing 43 is provided with lugs 45.

Also fixed upon the platform 32 is a pair of fruit ejecting cams 46, which are arcuately disposed about bearing 38, and a circular pit ejecting cam 47, a section of which lies between the cams 46.

Rotary fruit carrier 22

The rotary fruit carrier 22 includes a hub 50, which is mounted on the upper end of a shaft 51 which extends vertically through and is journalled in bearings 34 and 38. (See Fig. 3.) The hub 50 is held tightly in place on this shaft by a heavy cap screw 52. Carrier 22 has a continuous web 53 provided with a solid rim 54 at its periphery and the entire carrier has a relatively smooth horizontal upper surface 55. Disposed in an equally spaced circular formation concentric with the axis of the carrier 22, and located in the rim 54 thereof, is a series of vertical fruit receptacles 56 having counter bores 57 formed at the lower end thereof.

Figure 8:
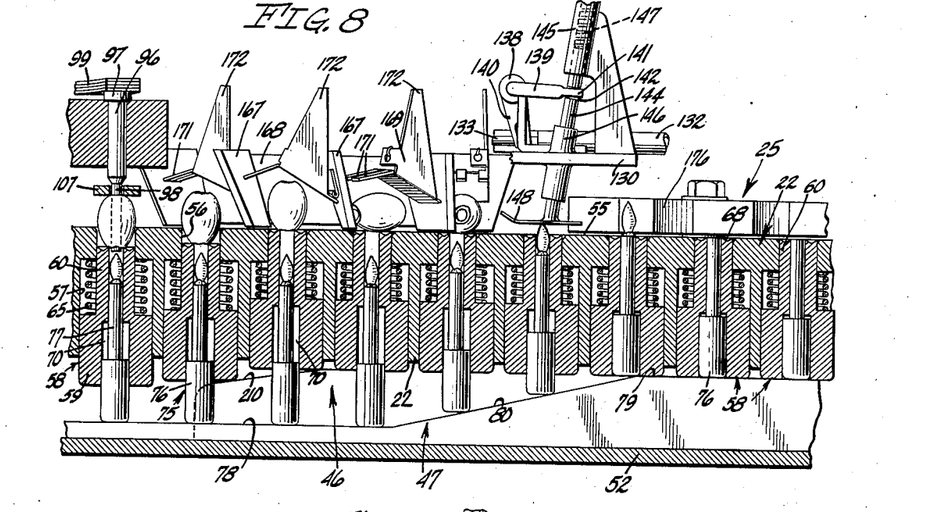
Fig. 8 is a diagrammatic enlarged vertical sectional view taken on the line 8—8 of Fig. 1 and illustrating the operation of the machine herein illustrated.

Extending upwardly into each of the counterbores 57 is a fruit ejector 58 having a base portion 59 which fits in the counter bore 57 and an upper portion 60 which slidably fits in the fruit receptacle 56. Coiled about the upper portion 60 between the upper end of the base portion 59 and the upper end of the counter bore 57 is an expansion spring 65 which constantly urges the fruit ejector 58 downwardly. Fixed by a cap screw on the lower face of the rim 54 opposite each of the counter bores 57 is a lug 66 which extends into engagement with a shoulder provided by a cut away portion 67 of the ejector 58 disposed in such counter bore, so as to prevent downward movement of said ejector below a position in which the leftwardmost ejector is shown in Fig. 8.

The upper surface of each fruit ejector 58 is provided with an annular furrow 68 which surrounds a vertical pit receiving hole 69 formed centrally in the ejector. The lower end of each hole 69 has a counterbore 70. A pit ejector 75 has a base portion 76, which fits in the counterbore 70 and rests at all times on the upper surface of the circular pit ejector cam rail 47. Each of the pit ejectors has an upper stem portion 77 which slidably fits in the pit receiving recess 69. In Fig. 8 it will be noted that the pit ejecting cam 47 has a "lower-level" face 78, an "upper-level" face 79 and an inclined face 80 connecting these. When resting on the lower-level face 78 of this cam 47, each pit ejector is disposed downwardly so as to withdraw the stem 77 downwardly from within the pit receiving recess formed by the upper end of the hole 69.

Compound pit punch 23

This element of the machine 20 includes a block 85 which is mounted upon the shafts 86, 87 and 88, which are mounted respectively for vertical sliding movement in bearings 40, 41, and 42. (See Figs. 1 and 2.) Coiled about the shafts 86 and 88 are expansive springs 89 which tend to lift the block 85 up to its uppermost position. Provided on the lower end of the slide shaft 87 is a roller 90, the purpose of which will be made clear hereinafter. Formed in the inner portion of the block 85, which overlies the rim 54 of the carrier 22, is a series of pit punch receiving holes 95. Each of these holes receives slidably a punch 96 having a relatively flat head 97 at its upper end and a punch stem 98 at its lower end. A series of individual leaf springs 99 are secured at one end of the block 85 so that the other end of each extends over one of the pit punches 96. Formed in the head 85 adjacent to each of the holes 95 is a vertical hole 100 for receiving a stripper supporting rod 105 having lock nuts 106 at its upper end and supporting a stripper 107 at its lower end. Each stripper 107 has an aperture 108 which receives the punch stem 98 adjacent thereto, thereby guiding the stripper 107 on this punch stem and retaining the stripper in a position in which it surrounds the punch stem. Stripper 107 also has a small bolt 109 adjustably provided thereon and extending downward therefrom to limit the downward movement of the stripper by the bolt engaging the carrier 22. The holes 95 and therefore the punches 96 disposed therein, are arcuately disposed so that the axis of each punch lies the same distance from the axis of the carrier 22 as the axes of fruit receptacles 56. The spacing of the centers of the holes 95 from each other is also identical with the spacing of the centers of the fruit receptacles 56. Coiled about each of the stripper supporting rods 100 between the stripper and the head 85, is a light expansion spring 110 for yieldably holding the stripper downwardly.

Cull segregating mechanism 24

Referring now particularly to Figs. 1, 3, 5, 6, 7 and 11, there is secured to the lugs 45 as by cap screws 115 a semi-annular housing 116, the floor 117 of which is horizontal and the outer wall 118 of which is inclined somewhat outwardly.

Figures 5, 6, 7:
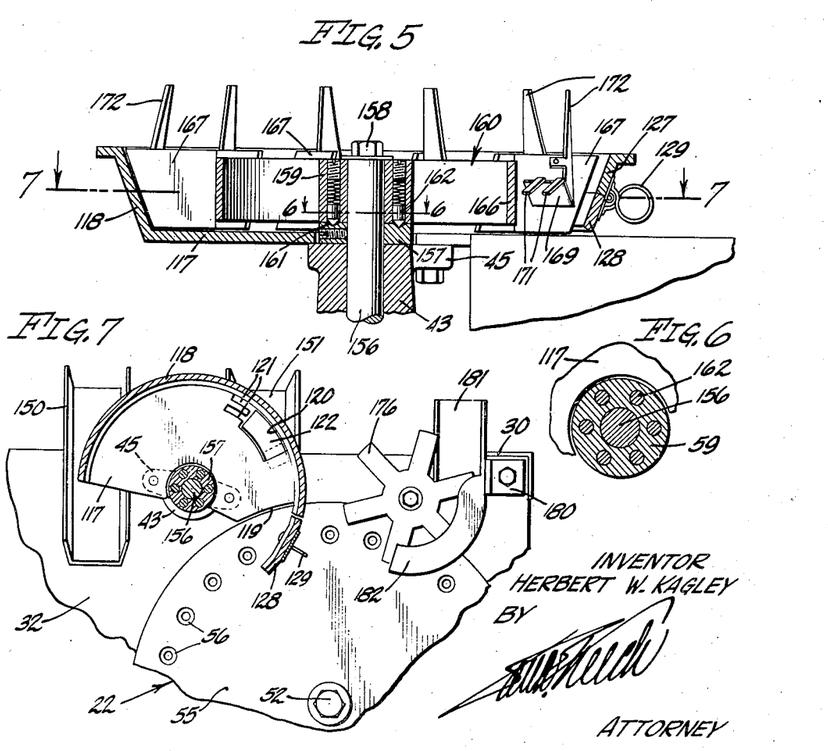
Fig. 5 is an enlarged vertical sectional view taken on the line 5—5 of Fig. 1.
Fig. 6 is a fragmentary horizontal sectional view taken on the line 6—6 of Fig. 5.
Fig. 7 is a fragmentary horizontal sectional view taken on the line 7—7 of Fig 5.

The upper surface of the floor 117 is on the same level as that of the upper surface 55 of the carrier 22, and extends very close to the periphery of the carrier as shown in Fig. 7. The housing 116 is only slightly more than semi-circular in extent so that the floor 117 has an edge 119 which is spaced a considerable distance from the carrier 22. (See Figs. 1 and 7.)

Provided in the floor 117 near the wall 118 (see Fig. 7) is an opening 120 having slots 121, there being a trap door 122 hingedly mounted on the bottom of the floor 117, and which is yieldably held upward by spring 123 so as to normally fill the hole 120 with the upper surface of the door flush with that of the floor 117.

The wall 118 is concentric with the axis of the bearing 43 on which the housing 116 is mounted, and the inner portion 127 of this wall overlies the carrier 22. (See Figs. 1, 5 and 7.) The portion 127 of the wall 118 has a door 128 along its lower edge which is yieldably held by spring 129 in downward position as shown in Fig. 5, in which position its lower edge extends relatively close to the upper surface 55 of the carrier 22 directly over the marginal area occupied by the fruit receptacles 56. The purpose of this door will be made clear hereinafter.

The wall 118 also provides a shelf 130 (see Figs. 1 and 2) on which is supported a pit actuated ejector control mechanism 151. This mechanism includes a trip bar slide bracket 132 in which a trip bar 133 is slidably supported. Provided on the bar 133 is a pin 134. (See Fig. 12.)

Figure 2:
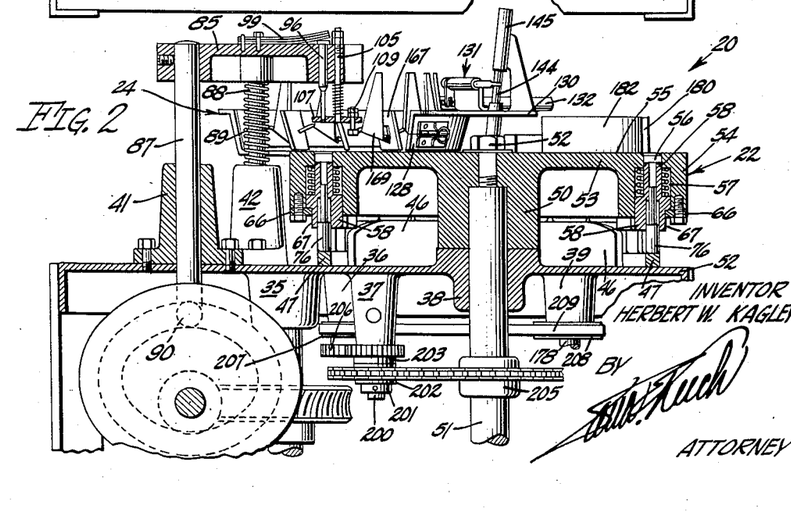
Fig. 2 is a vertical sectional view taken on the line 2—2 of Fig. 1.
Figure 3:
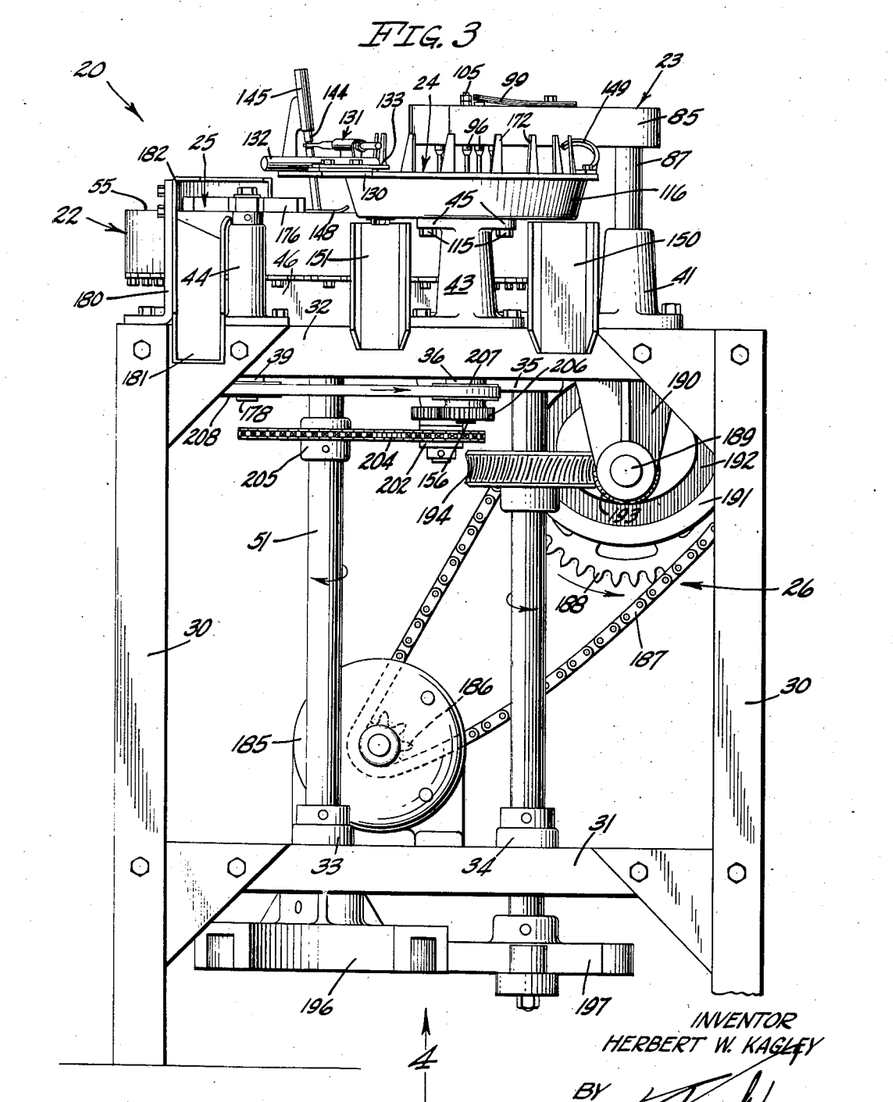
Fig. 3 is a rear elevational view of the entire machine taken in the direction of the arrow 3 in in Fig. 1.
Figure 12:
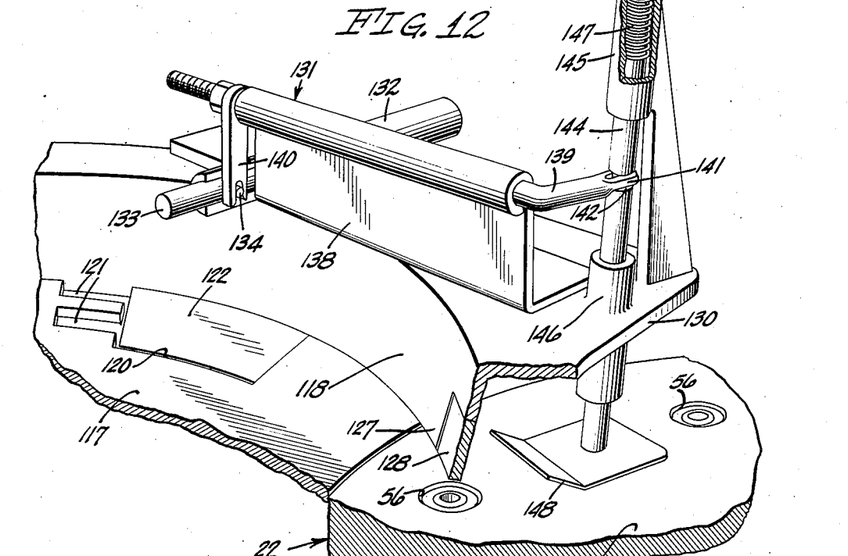
Fig. 12 is a detailed view illustrating the pit responsive mechanism for withdrawing the cull ejector tripping bar to prevent the ejection of a good piece of fruit.
Figure 13:
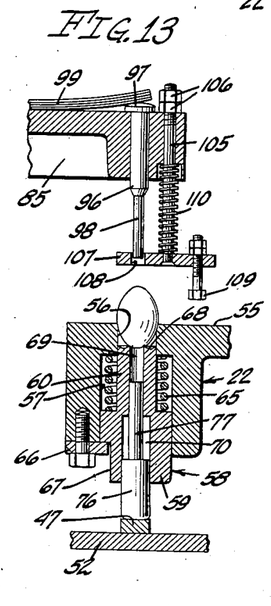
Fig. 13 is a diagrammatic operation view illustrating a fruit receptacle containing a piece of fruit in alignment with a pit punch as at the beginning of a pit punching operation.
Figure 14:
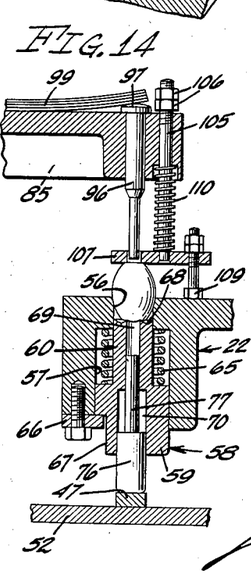
Fig. 14 is a view similar to Fig. 13, illustrating the initial downward movement of the pit punch at the stage where the stripper first contacts the fruit.
Figure 15:
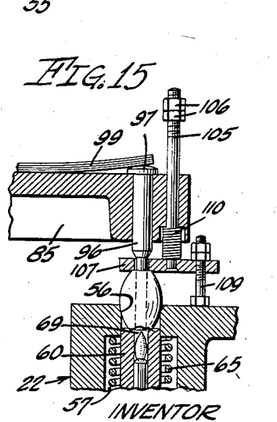
Fig. 15 is a view similar to Fig. 14, illustrating the pit punch in its lowermost position.

Also supported on the shelf 130 is a bearing bracket 138 in which a bell crank 139 is pivotally mounted. This bell crank has an arm 140 which straddles the pin 134 as shown in Figs. 2 and 12. Bell crank 139 also has a bifurcated arm 141 which straddles a neck portion 142 formed on a rod 144 which is slidably mounted in a slightly inclined position in bearing tubes 145 and 146 also supported on the shelf 130. Trapped in the upper end of the tube 143 is a spring 147 tending to force the rod 143 downwardly. Fixed upon the lower end of the rod 144 is a pit engaging shoe 148 which normally lies downward against or very close to the upper surface of the carrier 122. The shoe 148 is held in this position by the spring 147. The purpose of the cull ejector control mechanism 131 will be made clear hereinafter.

Provided on the wall 118 just beyond the floor edge 119 is a finger 149 the purpose of which will be made clear hereinafter.

Mounted on the upper frame platform 32 directly beneath the edge 119 and the finger 149 is a good-olive chute 150. Disposed directly beneath the trap door 122 is a cull-olive chute 151. These chutes empty into suitable containers (not shown) for receiving good olives and cull olives respectively.

Journalled in the bearings 36 and 43, (see Figs. 2, 3 and 5) is a shaft 156, a collar 157 being fixed thereon above the bearing 43. Mounted on the extreme upper portion of the shaft 156 and resting on the collar 157 and held downward thereagainst by a cap screw 158 is the hub 159 of a fruit segregating wheel 160. The collar 157 is provided with suitable detent pits 161 into which detents 162 provided on the hub 159 are spring pressed so as to yieldably lock the hub 159 to the collar 157.

Figure 1:
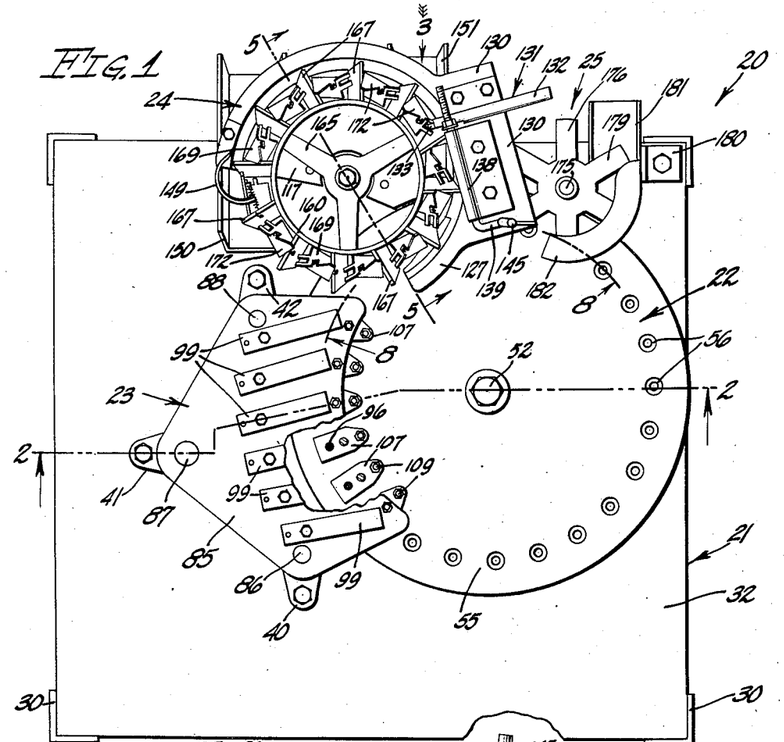
Fig. 1 is a plan view of a preferred embodiment of my invention, especially adapted for pitting olives.
Figure 11:
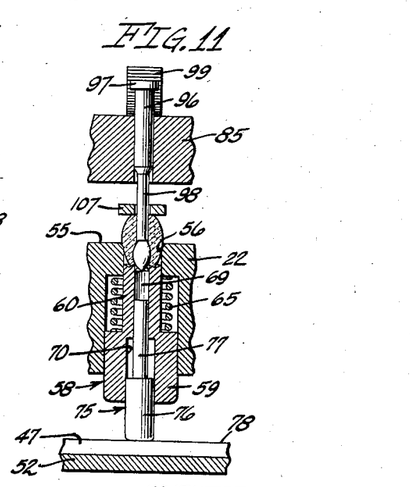
Fig 11 is a diagrammatic operation view illustrating the result of a pit punch attempting to pit an olive with an abnormally large pit.

The wheel 160 has spokes 165 and a rim 166 and secured upon the outer face of the rim and extending radially therefrom so as to be uniformly inclined from the vertical, as shown in Figs. 1 and 8, are fruit propelling blades 167. These blades are spaced relatively closely together to form fruit pockets 168. Disposed in each of these pockets, and hingedly mounted upon the foremost one of the blades 167 which form said pocket, is a cull ejector 169. As best illustrated in Fig. 11 this ejector is preferably made of sheet metal and has a flat body 170, a pair of fingers 171 extending from the free edge thereof, and an actuating fin 172 extending upwardly from the outer side edge thereof. Yieldably holding each ejector 169 in its uppermost position is a contractile spring 173. As indicated in Fig. 8 the fins 172 are so positioned on the wheel 160 that as the latter rotates, each of the fins 172 will just clear the trip bar 133 when the bell crank 139 is locked by a pit lifting the shoe 148 so as to retract the bar 133 as shown in Fig. 8. When the shoe 148 is not so lifted, however, the bell crank 139 is rocked by spring 147 so as to extend the trip bar 133 into the path of the upwardly extending ejector fin 172 with a result which will be indicated hereinafter in the description of the operation.

Pit remover 25

Journalled in the bearings 39 and 44 is a shaft 175 upon the upper end of which is fixed a spider 176 which is preferably formed of rubber and the legs 179 of which sweep directly over the upper surface of the fruit carrier 122 upon the rotation of the shaft 175. Supported by a bracket 180 provided on the upper frame platform 32 is a pit receiving chute 181 and a sweep arm 182 which extends out over the upper surface of the carrier 22 close to the arcuate path followed by the outer ends of the arms 179 as the spider 176 rotates.

Power mechanism 26

Mounted on the lower frame platform 31 is a gear reduction electric motor 185, a drive sprocket 186 of which is connected by a link chain 187 to a driven sprocket 188, the latter being fixed upon a shaft 189 which is journalled in bearings 190 mounted on the lower face of the upper frame platform 32. Also fixed on shaft 189 is an elliptic cam 191 having a cam race 192 into which the roller 90, provided on the lower end of the shaft 87 is at all times disposed. (See Fig. 2.) Also fixed on shaft 189 is a spiral pinion 193 which meshes with a one to two ratio, with a spiral gear 194, which is fixed on a counter shaft 195, the latter being journalled in bearings 34 and 35.

Fixed upon the lower end of the shaft 51 is a Maltese cross 196 and upon the lower end of the shaft 195 is a Maltese cross actuator 197. These elements are related as clearly shown in Fig. 4 so that for each half revolution of shaft 195, shaft 51 receives a quarter revolution, this quarter revolution of the shaft 51 being transmitted thereto during a one-quarter revolution of the shaft 195. It is thus seen that following each quarter revolution of the shaft 51, the latter remains stationary during a quarter revolution of the shaft 195.

Fixed in the bearing 37 is a sub-counter shaft 200 having a collar 201 at its lower end which retains in place on the shaft, a sprocket 202 and a spur gear 203, the latter being rigidly united with said sprocket. The sprocket 202 is connected by a chain 204 to a sprocket 205 fixed on the shaft 51, the drive ratio between the sprocket 205 and the sprocket 202 being two to one. Fixed on the lower end of the shaft 156 (the upper end of which carries the separating wheel 160) is a spur gear 206, which meshes with the spur gear 203, and a belt pulley 207 which is fixed to the spur gear 206. Fixed upon the lower end of the shaft 178 (which carries on its upper end the pit remover spider 176) is a pulley 208 which is connected with the pulley 207 by a belt 209.

Operation

The electric motor 185 is continuously energized during the operation of the machine 20. This causes continuous rotation of the shaft 189 and 195 and intermittent rotation of the shaft 51 and all parts driven therefrom. These include the fruit carrier 22 which is mounted directly on shaft 51, the fruit segregating wheel 160 and the pit remover spider 176. The latter two elements rotate in the same direction which is opposite to that in which the carrier 22 rotates, as indicated by the arrows in Fig. 1.

Owing to the two to one fixed ratio between the sprockets 202 and 205, the wheel 160 and spider 176 rotate twice as many revolutions per minute as the fruit carrier 22. Due to the continuous rotation of the shaft 189, the shaft 87 is reciprocated vertically in timely relation therewith by engagement of the roller 90 with walls of the cam race 192. This reciprocates the compound pit punch 23 so as to extend the pit punches 96 downwardly as indicated at the left end of Fig. 8 to punch the pit from an olive or other piece of fruit supported thereunder in a fruit receptacle 56 of the carrier 22. It is essential, of course, in order to accomplish this, that the carrier 22 be stationary during the pit punching operation and that it be halted with a group of receptacles 56 in vertical alignment with the punches 96.

It is to be noted that, in the preferred embodiment illustrated, there are twenty-four fruit receptacles 56 in the carrier 22 and there are six punches 96 on the compound pit punch 23. As the axes of the punches 96 are equally spaced, the same distance as the axes of the receptacles 56 are spaced apart, and as the axes of the punches are disposed the same distance from the axis of the carrier 22 as the axes of the fruit receptacles are spaced from said axis, it is thus possible by rotation of the carrier 22 to bring the axes of any consecutive group of six fruit receptacles 56 into vertical alignment with the pit punches 96.

The mode of operation of the machine 20 embraces dividing the fruit receptacles 56 into four equal groups of six receptacles each and arranging the intermittent rotation of the fruit carrier 22 to bring each of these groups of fruit receptacles successively into vertical alignment with the pit punches 96 during four successive reciprocations of the compound pit punch 23. To understand how this is accomplished, it is first to be noted (see Figs. 2 and 3) that the cam race 122 is such that during one-half of each rotation of the cam 191 the compound pit punch 23 is disposed practically in its uppermost position. During the other half of the revolution of the cam 191, the pit punch 23 is drawn downwardly into full downward pit punching position and then moved back upwardly into practically its uppermost position.

Figure 4:
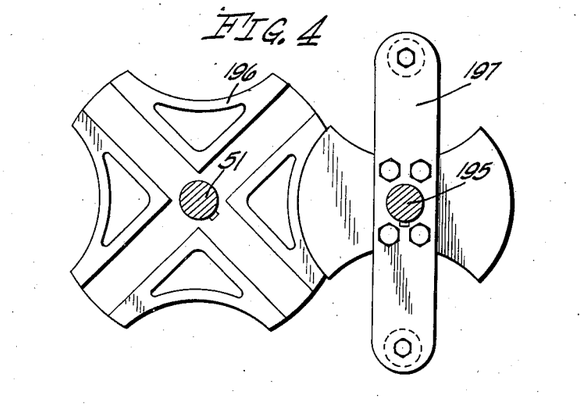
Fig. 4 is a bottom plan view of a Maltese cross gear connection at the bottom of the machine and is taken in the direction of the arrow 4 in Fig. 3.

The relation of the Maltese cross members 196 and 197 is such that during the half revolution of the cam 191 and shaft 189, during which the compound pit punch 23 is disposed practically in its uppermost position, a quarter revolution is being transmitted through the Maltese cross mechanism to the shaft 51 to present a new group of six fruit receptacles 56 beneath the pit punches 96. During the following half revolution of the cam 191 and shaft 189 which causes the downward and upward reciprocation of the compound pit punch 23, the shaft 51 is held against rotation by the locking relation of the Maltese cross members 196 and 197 as illustrated in Fig. 4, in which the shaft 51 is locked against rotation but the shaft 195 continues to rotate.

As before mentioned, the pit ejector bases 76 always rest upon the ring cam 147 which determines the height of the pit ejectors 75 relative to the fruit ejectors 58. It is now to be noted that the lower-level face 78 of this cam extends throughout the length of this cam excepting where this cam is provided with the inclined surface 80, the upper cam surface 79, and a decline (not shown) which is disposed just beyond the pit remover 25 and which leads from the surface 79 back to the lower level cam surface 78. It is further to be noted that the incline 80 is located just beneath and in advance of the pit control shoe 148. It is also pointed out that the cams 46 are located so as to engage the pit ejectors 58 only when the rotation of the carrier 22 brings these fruit ejectors out from under the compound pit punch 23 and opposite the cull segregating mechanism 24 (see Fig. 8).

From the facts above pointed out, it is clear that from the time each fruit receptacle 56 passes clockwise with the rotating carrier 22 beyond the sweep arm 182, and the time when it passes again underneath the compound pit punch 23, the fruit ejector in that receptacle is disposed at its lowermost position against the lug 66 for supporting it, and the pit ejector 75 of this receptacle is disposed in its lowermost position as shown at the left of Fig. 8, that is: resting upon the lower-level face 78 of cam 47.

With both the fruit and pit ejectors 58 and 75 in the fruit receptacle 56 thus exposed, lowered to make room in this receptacle for a piece of fruit, the operator places an olive in each of these receptacles with the olive's axis disposed vertically, this being accomplished during the interval when the carrier 22 is stationary. With each intermittent quarter rotation of the carrier 22, therefore, to bring a new group of six fruit receptacles beneath the compound pit punch 23, each of the receptacles in this group contains an olive positioned properly to have the pit thereof punched from the olive. Thus, when the carrier is brought to rest with its new group of filled fruit receptacles aligned with the pit punches 96, the downward movement of the punch head 85, which immediately follows, results in punching the pit from each of the olives in that group of receptacles.

This is assuming, of course, that there are no abnormally sized pits in the fruit contained in these receptacles and the latter situation will be discussed after completing the discussion of the operation where the pits in the fruit handled are of normal size.

Fig. 8 is an illustration of the mode of operation with fruit with normal sized pits. This view illustrates progressive ejecting of the pitted fruit and the pits from the mechanism. Here it is seen that owing to the timing of the fruit segregating wheel 160, so as to run at twice the revolutions per minute of the carrier 22, one of the twelve pockets 168 on the wheel 160 comes over and embraces the space above each of the fruit receptacles 56 as the carrier 22 is rotated. Just as this particular pocket 168 moves into embracing relation with the space over one of the fruit receptacles 56, the fruit ejector 58 thereof rides up on the sloping base 210 of the cam 46 so as to eject the fruit from the receptacle. The fruit thus ejected is then swept from the upper surface of the carrier 22 on to the floor 117 of the housing 116 by the engagement with the fruit of the blade 167 disposed to the rear thereof.

It is to be borne in mind that if the pit in a given piece of fruit is of normal size there will be ample room for it in the pit hole 69 so that the pit will be ejected from the fruit into the pit hole during the pit punching operation. The pit will then remain therein, as shown in Fig. 8, until the pit ejector therebeneath rides up on the cam face 80 so as to start ejecting the pit from the pit hole, causing the pit to engage the shoe 148 and lift this. The result of this is to withdraw the trip bar 133 from its normal position in advance of the cull ejector fin 172 which is advancing towards said trip bar owing to rotation of the wheel 160. The emerging of the pit from this pit hole so as to lift the shoe 148 is thus seen to act as a determining factor as to whether or not each of the cull ejector fins 172 is brought into engagement with the trip bar 133 as the segregating wheel 160 rotates.

The mechanism is so timed that the fruit from which the pit was taken (which pit is at any time thus engaging the shoe 148) is being carried around the wheel 160 in one of the pockets 168 which is just approaching the position of the cull ejector trip bar 133. It is also to be noted that at this moment this particular pocket 168 is also just approaching a position in which it will be disposed directly over the trap door 122 in the floor 117 of the housing 116. As this door is normally closed, nothing happens when the cull ejector control bar is withdrawn as just described by a pit engaging the shoe 148. Instead, the pitted olive just mentioned continues to be rolled by the blade 167 immediately to the rear thereof, over the trap door 122 and on around over the floor 117 until it reaches the edge 119 thereof, whereupon it drops by gravity into the good olive chute 150, down which it gravitates into a suitable container (not shown) provided for it.

Where the fruit pitted is sticky, such as dates and the like, the pitted fruit tends sometimes to adhere to parts of the wheel 160 after it rides over the edge 119 of the floor 117 and for this reason the finger 149 is provided to engage the cull ejector of each pocket 168 to deflect this ejector downwardly and then release it with a snap action so as to jar the pitted fruit loose and cause it to gravitate into the chute 150.

Figure 9:
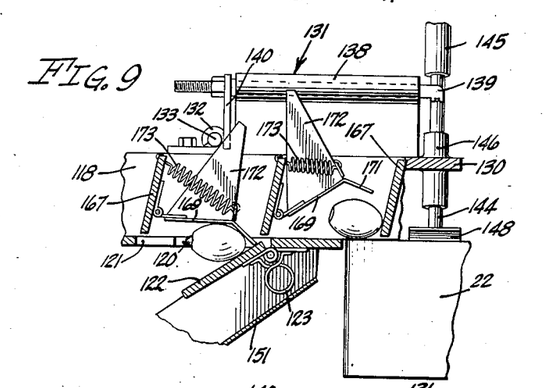
Fig. 9 is an enlarged detailed view taken on the line 9—9 of Fig. 1 and illustrating an initial stage in the ejection of a cull from the machine.
Figure 10:
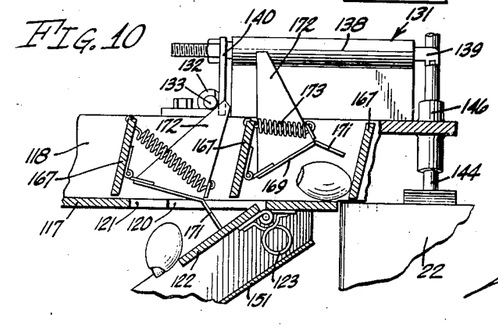
Fig. 10 is a view similar to Fig. 9 illustrating the completion of the cull ejecting operation.

The segregation of cull fruit from good fruit by the segregator 24 is accomplished as a result of the fact that the cull fruit is all caused by abnormally sized pits which reduce the amount of meat in the fruit to an extent as to make the pitted fruit of poor weight and poor quality, even though it were possible to pit this. Accordingly, it is desirable to separate the fruit having these abnormally sized pits from the fruit having normal sized pits. This is accomplished in the following manner:

When any piece of fruit having an abnormally sized pit is placed in one of the receptacles 56 and operated upon by the downward movement of a punch 96, the pit, being to large to pass downwardly into the pit hole 69, disposed therebeneath, resists downward movement of the punch, thereby causing a flexing of the spring 99 which holds down that particular punch in a normal punching operation, this flexing being clearly shown in Fig. 10. As a result of this, the pit in this particular olive remains in the olive when the latter is received in one of the pockets 168 of the wheel 160. Furthermore, the pit hole 69 of the receptacle 56 in which this olive had reposed is empty. When this pit hole comes around opposite the shoe 148, therefore, the shoe will remain in a downwardmost position close to the upper face of the carrier 22. At this time, the pocket 168 of the wheel 160, containing the cull olive with an oversized pit in it, is just approaching the cull fruit ejector trip bar 133 which is extended into the path of the ejector fin 172 of that pocket. This results in this fin 172 engaging the bar 133 as shown in the left hand side of Fig. 9, thereby depressing the cull ejector 169, forcing the cull olive downwardly against the trap door 122 disposed immediately therebeneath, thus opening the trap door and ejecting the cull olive downwardly therethrough into the chute 151 disposed therebeneath. As the further rotation of the wheel 160 causes this particular cull ejector 169 to travel onward out of engagement with the trap door 122, the latter is permitted to rise upwardly to present a smooth floor for the olive carried in the next following pocket 168 by the passage of the fingers 171 of this particular cull ejector into the slots 121 provided at the forward edge of the trap door opening 120.

It is thus seen that olives having pits of such large size that they will not enter the pit recesses 69 are segregated from the rest of the olives, which are properly pitted, and are discharged through the trap door 122 into the chute 151 for receiving the cull olives. Also, it is believed clear that all other olives which are properly pitted are carried around with the wheel 160 and deposited in the chute 150.

After each pit has been ejected upwardly so as to lift the shoe 148, it is carried on with the carrier 22 as the latter rotates until engaged by one of the arms of the pit spider 176 which sweeps this pit off from the carrier 22 and into the pit receiving chute 181.

The provision of a yieldable door 128 on the wall portion 127 which extends over the carrier 22 is for the purpose of permitting the passage beneath the wall portion 127 of a pit which is of just that size as to be jammed into one of the pit holes 69 leaving the upper portion of the pit extending upwardly above that pit hole. In case this should happen, the olive of such a pit would probably remain adhering to the portion of the pit extending out of the hole 69 and this olive would probably be smashed in passage of the pit underneath the door 128. While a pit so jammed in the upper end of the pit hole 69 might engage and lift the shoe 148, this would not result in failure of the cull segregating mechanism as the cull olive in this case would not be left on the wheel 160 but would be dragged by the pit underneath the door 128. The pit thus jammed in a pit hole 69 would be discharged in the same manner by the pit ejector rising in that hole as shown in Fig. 8, and that pit and the fragments of its olive would travel around upon the carrier 22 until they are engaged by the legs of the spider 176 and swept into the pit chute 181.

In operation of the machine 20, the fruit is always sized before being handled by the machine and the carrier 22 and its associated parts are always built to provide receptacles 56 of the proper size to handle a certain one of the sizes of fruit which may be pitted with the machine. In order to change the machine to handle a different size of fruit, it is merely necessary to replace the carrier 22 and the fruit and pit ejectors found thereon with a carrier assembly having fruit receptacles and pit holes adapted for the new size and shape of fruit to be handled.

It is thus seen that I have provided a novel fruit pitting machine having many advantages over those found in the prior art as pointed out hereinabove. While I have shown only a single embodiment of that invention, it is to be understood that various changes may be made in this without departing from the spirit of the invention or the scope of the appended claims.

What I claim is:

1. In a fruit pitting machine the combination of: a carrier for receiving and carrying the fruit to be pitted, said carrier having means for retaining a multiplicity of individual pieces of fruit in definite positions thereon; means for removing the pits from a group of said pieces of fruit while the latter are so positioned on said carrier and while said last mentioned means has a predetermined relation with said carrier; means for coordinately actuating said carrier and pit removing means in timed relation to subject successive groups of said fruit to the action of said pit removing means; and means for automatically removing from said carrier fruit thus operated upon and segregating properly pitted fruit from that which was improperly pitted.

2. In a fruit pitting machine the combination of: a carrier for receiving and carrying the fruit to be pitted, said carrier having means for retaining a multiplicity of individual pieces of fruit in definite positions thereon; means for removing the pits from a group of said pieces of fruit while the latter are so positioned on said carrier and while said last mentioned means has a predetermined relation with said carrier; and means for coordinately actuating said carrier and pit removing means in timed relation to subject successive groups of said fruit to the action of said pit removing means; and means for automatically removing from said carrier fruit thus operated upon and segregating said fruit in accordance with the size of the pits thereof.

3. In a fruit pitting machine the combination of: a table having a fruit receptacle for receiving a piece of fruit to be pitted; a fruit ejector mounted in the bottom of said recepacle, said fruit ejector having a pit receiving recess formed therein; a pit punch; a pit ejector movable in said recess; and means for coordinately actuating said pit punch, said fruit ejector, and said pit ejector, to respectively punch a pit from said fruit into said recess, eject said fruit from said receptacle, and thereafter eject said pit from said recess; thereby permitting separation of the pits from the pitted fruit.

4. In a fruit pitting machine the combination of: pit punching means; a mechanism for handling the fruit after the pitting operation; a mechanism for handling the pits after the pitting operation; and means for coordinating the fruit handling and pit handling mechanisms to determine a segregation of the fruit upon which the pitting operation was successful from that on which it was unsuccessful, such segregation taking place after the pitting operation.

5. In a fruit pitting machine the combination of: a rotary carrier having fruit receptacles for fruit to be pitted, there being a pit hole in the bottom of such receptacle; yieldable pit punching means for punching a pit from fruit resting in said receptacle and driving said pit through said hole, such pit punching means being adapted to yield when a piece of fruit is presented thereto having a pit which is incapable of passing through said hole; and means for removing said fruit from said receptacle and segregating the fruit having pits too large to enter said holes from the balance of the fruit.

6. In a fruit pitting machine the combination of: a movable fruit carrier having fruit receptacles provided thereon; floors for said receptacles; fruit ejecting means associated with the floor of each of said receptacles, there being a pit receiving hole in each of said floors; pit ejecting means adapted to operate in said holes to eject the pit therefrom; pit punching means for punching pits from fruit in said receptacles to drive said pits into said holes; and means for coordinately operating the aforementioned fruit carrier, pit punching, and fruit and pit ejecting means to first punch the pits from the fruit into said holes and thereafter successively eject the fruit from said receptacles and the pits from said holes.

7. A combination as in claim 6 in which the operation of said fruit ejecting and pit ejecting means is accomplished incidental to the movement of said carrier and in timely relation therewith.

8. A combination as in claim 6 in which an annular ditch is provided in the upper face of each of said floors surrounding said pit hole.

9. A combination as in claim 6 in which said pit punching means is yieldable to prevent crushing a pit which is too large to enter one of said pit holes; and means for segregating fruit following the pit punching operation, from which the pits have been punched, from that fruit from which the pits have not been punched.

10. In a fruit pitting machine the combination of: a movable fruit carrier having fruit receptacles provided thereon; fruit ejecting means forming the floor of each of said receptacles, there being a pit receiving hole in each of said floors; pit ejecting means adapted to operate in said holes to eject the pit therefrom; pit punching means that operate in said holes to eject the pits therefrom; pit punching means for punching pits from fruit in said receptacles to drive said pits into said holes; and means for coordinately operating the aforementioned fruit carrier, and said pit punching, fruit ejecting and pit ejecting means to first punch the pits from the fruit into said holes, and thereafter successively eject the fruit from said receptacles and the pits from said holes.

11. In a fruit pitting machine the combination of: means for punching a pit from a piece of fruit, said means including a punch and a fruit rest having a hole therein for receiving the pit said means being operative only where the pit is of a proper size and properly positioned to enter said hole; means for ejection of the pit from said hole; and means responsive to said ejection of said pits or the failure of such a pit to be ejected to segregate the fruit from which pits are punched into said hole and the fruit from which pits are not punched into said hole.

12. In a fruit pitting machine the combination of: a carrier; fruit positioning means on said carrier; pit punching means for punching normal sized pits, said means failing to remove oversize pits from the fruits having these; and means operating in timely relation with said carrier for automatically segregating the fruit run through said pit punching means to separate the pitted fruit from that not pitted.

13. In a fruit pitting machine, the combination of: a carrier; fruit positioning means on said carrier; pit punching means for punching normal sized pits, said means failing to remove over-sized pits from the fruits having these; and means governed by the reaction of the pits of fruit to said pit punching means for automatically segregating the fruit run through said machine to separate the pitted fruit from that not pitted.

14. In a fruit pitting machine, the combination of: means for pitting fruit, said means being operative under certain conditions to pit fruit fed thereto and inoperative under other conditions to pit fruit fed thereto; and means responsive to the success or failure of said pitting means to pit fruit fed thereto for segregating fruit passing through said pitting machine into pitted fruit and fruit on which said pitting operation was unsuccessful.

15. In a fruit pitting machine, the combination of: fruit pitting means, said means being operative under certain conditions to pit fruit fed thereto and inoperative under other conditions to pit fruit fed thereto; and means operating in timely relation with said fruit pitting means for automatically segregating fruit run through said machine to separate the pitted fruit from that not pitted.

16. In a fruit pitting machine, the combination of: fruit pitting means, said means being operative under certain conditions to pit fruit fed thereto and inoperative under other conditions to pit fruit fed thereto; and means operating in timely relation with said fruit pitting means and governed by the reaction of the pits of the fruit to the latter for automatically segregating fruit run through said machine to separate the pitted fruit from that not pitted.

HERBERT W. KAGLEY.